US 11,552,885 B2

(12) United States Patent
Takashima et al.

(10) Patent No.: US 11,552,885 B2
(45) Date of Patent: *Jan. 10, 2023

(54) NETWORK SYSTEM AND ROUTING METHOD

(71) Applicant: NEC CORPORATION, Tokyo (JP)

(72) Inventors: Masanori Takashima, Tokyo (JP); Tomohiro Kase, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/066,777

(22) Filed: Oct. 9, 2020

(65) Prior Publication Data

US 2021/0029027 A1  Jan. 28, 2021

Related U.S. Application Data

(63) Continuation of application No. 15/724,384, filed on Oct. 4, 2017, now Pat. No. 10,819,625, which is a (Continued)

(30) Foreign Application Priority Data

Jan. 13, 2011  (JP) ................. 2011-005137

(51) Int. Cl.
*H04L 45/00* (2022.01)
*H04L 49/00* (2022.01)
(Continued)

(52) U.S. Cl.
CPC ............ *H04L 45/38* (2013.01); *H04L 45/306* (2013.01); *H04L 45/52* (2013.01); *H04L 45/64* (2013.01);
(Continued)

(58) Field of Classification Search
CPC ....... H04L 45/306; H04L 45/38; H04L 45/52; H04L 45/64; H04L 45/72; H04L 45/74; H04L 47/2483; H04L 49/70
See application file for complete search history.

(56) References Cited

U.S. PATENT DOCUMENTS 5,920,705 A    7/1999  Lyon et al.
6,526,052 B1   2/2003  Rijhsinghani
(Continued)

FOREIGN PATENT DOCUMENTS

CN    101394346 A    3/2009
JP    2008-187686 A   8/2008
(Continued)

OTHER PUBLICATIONS

Gude et al., "NOX: Towards an Operating System for Networks", ACM SIGCOMM Computer Communication Review. vol. 38. Issue 3, Jul. 2008 pp. 105-110 (Year: 2008).*
(Continued)

*Primary Examiner* — Shah M Rahman
(74) *Attorney, Agent, or Firm* — Sughrue Mion, PLLC

(57) ABSTRACT

A network system includes a communication apparatus, and a control apparatus configured to control the communication apparatus. The communication apparatus includes a memory configured to store program instructions, and a processor configured to execute the instructions to receive an address of a destination virtual machine from the control apparatus, receive a packet from a source virtual machine, identify, based on the address of the destination virtual machine corresponding to the received packet, an identifier of an edge node connected to the destination virtual machine, and add the identifier of the edge node to the received packet.

12 Claims, 6 Drawing Sheets

Related U.S. Application Data continuation of application No. 13/995,921, filed as application No. PCT/JP2011/080325 on Dec. 27, 2011, now Pat. No. 9,787,580.

(51) Int. Cl.
| | |
|---|---|
| *H04L 45/302* | (2022.01) |
| *H04L 45/52* | (2022.01) |
| *H04L 45/64* | (2022.01) |
| *H04L 45/74* | (2022.01) |
| H04L 47/2483 | (2022.01) |

(52) U.S. Cl.
CPC .............. *H04L 45/74* (2013.01); *H04L 49/70* (2013.01); *H04L 45/72* (2013.01); *H04L 47/2483* (2013.01)

(56) References Cited

U.S. PATENT DOCUMENTS

| | | |
|---|---|---|
| 6,876,654 B1 | 4/2005 | Hegde |
| 8,369,333 B2 | 2/2013 | Hao et al. |
| 8,761,152 B2 | 6/2014 | Rixner et al. |
| 9,210,065 B2 | 12/2015 | Hao et al. |
| 2003/0156541 A1 | 8/2003 | Haihong |
| 2005/0094568 A1 | 5/2005 | Judd |
| 2005/0232263 A1 | 10/2005 | Sagara |
| 2006/0002298 A1 | 1/2006 | Suzuki et al. |
| 2006/0056384 A1 | 3/2006 | Ishii et al. |
| 2006/0098589 A1 | 5/2006 | Kreeger et al. |
| 2006/0117058 A1 | 6/2006 | Smith |
| 2007/0183421 A1 | 8/2007 | Terrell et al. |
| 2008/0008165 A1 | 1/2008 | Ikeda et al. |
| 2008/0101396 A1* | 5/2008 | Miyata ................ H04L 12/66 370/408 |
| 2008/0175251 A1 | 7/2008 | Oouchi et al. |
| 2008/0189769 A1 | 8/2008 | Casado et al. |
| 2009/0083438 A1 | 3/2009 | Matsumoto et al. |
| 2009/0138577 A1 | 5/2009 | Casado et al. |
| 2009/0249472 A1 | 10/2009 | Litvin et al. |
| 2010/0054124 A1 | 3/2010 | Ishihara et al. |
| 2010/0107162 A1 | 4/2010 | Edwards et al. |
| 2010/0257263 A1 | 10/2010 | Casado et al. |
| 2010/0306408 A1 | 12/2010 | Greenberg et al. |
| 2011/0202920 A1* | 8/2011 | Takase ................ G06F 9/45558 718/1 |
| 2011/0211583 A1 | 9/2011 | Seetharaman et al. |
| 2011/0261825 A1 | 10/2011 | Ichino |
| 2011/0267954 A1* | 11/2011 | Seetharaman .......... H04L 45/30 370/241 |
| 2011/0271007 A1* | 11/2011 | Wang .................. H04L 45/7453 713/160 |
| 2011/0273988 A1* | 11/2011 | Tourrilhes ............. H04L 43/062 370/235 |
| 2011/0286359 A1 | 11/2011 | Shimonishi |
| 2011/0299537 A1 | 12/2011 | Saraiya et al. |
| 2011/0317559 A1 | 12/2011 | Kern et al. |
| 2012/0099591 A1 | 4/2012 | Kotha et al. |
| 2012/0155467 A1 | 6/2012 | Appenzeller |
| 2012/0177039 A1 | 7/2012 | Berman |
| 2012/0263186 A1 | 10/2012 | Ueno |
| 2012/0275328 A1* | 11/2012 | Iwata .................. H04L 61/2592 370/252 |
| 2013/0058351 A1* | 3/2013 | Casado .................. H04L 47/00 370/400 |
| 2013/0060929 A1* | 3/2013 | Koponen ............... H04L 49/70 709/224 |
| 2013/0060940 A1* | 3/2013 | Koponen ........... H04L 41/0896 709/225 |
| 2013/0170492 A1* | 7/2013 | Lu ....................... H04L 12/4625 370/392 |
| 2013/0188489 A1 | 7/2013 | Sato |

FOREIGN PATENT DOCUMENTS

| | | |
|---|---|---|
| JP | 2009-077219 A | 4/2009 |
| JP | 2010-193019 A | 9/2010 |
| RU | 2189072 C2 | 9/2002 |
| WO | WO 2010/103909 A1 | 9/2010 |
| WO | WO 2010/110235 A1 | 9/2010 |

OTHER PUBLICATIONS

United States Notice of Allowance dated Jun. 23, 2020 in U.S. Appl. No. 15/724,384.
United States Office Action dated Jan. 24, 2020 in U.S. Appl. No. 15/794,384.
United States Office Action dated Jun. 18, 2019 in U.S. Appl. No. 15/724,384.
United States Office Action dated Sep. 21, 2018 in U.S. Appl. No. 15/724,384.
Decision to Grant (dated Jun. 24, 2014) of corresponding JP Application No. 2012-552660.
Decision to Grant (dated Sep. 28, 2015) of corresponding RU Application No. 2013132519.
Advisory Action (dated Sep. 14, 2016) of corresponding U.S. Appl. No. 13/995,921.
Casado, et al., "Ethane: taking control of the Enterprise", Aug. 27-31, 2007, SIGCOMM, 2007 ACM 978-7-59593-713-1/07/0008.
International Search Report dated Feb. 28, 2012 in PCT/2011/080325, with English translation thereof.
"OpenFlow Switch Specification Version 1.0.0 (Wire Protocol 0x01) Dec. 31, 2009", <http://www.openflowswitch.org/documents/openflow-spec-v1.0.0.pdf>.
"The Openflow Switch consortium", <http://www.openflowswitch.org/>.
English translation of PCT/ISA/237 (written opinion of the international searching authority, dated Mar. 13, 2012).
PCT/IB/373 dated Jul. 16, 2013.
Taiwanese Office Action dated Nov. 18, 2014 with an English Translation thereof.
Russian Office Action dated Feb. 13, 2015 with English Translation.
Chinese Office Action dated Feb. 25, 2015 with an English Translation.
Extended European Search Report, dated Nov. 4, 2016, of corresponding EP Application No. 11855288.4 and English Translation thereof.
Hideyuki Shimonishl et al., "Virtualized network infrastructure using OpenFlow", Network Operations and Management Symposium Workshops (NOMS WKSPS), 2010 IEEE/IFIP, IEEE, Piscataway, NJ, USA, Apr. 19, 2010 (Apr. 19, 2010), pp. 74-79, XP031690721, ISBN: 978-1-4244-6037-3.
Office Action in U.S. Appl. No. 13/995,921 dated Jan. 28, 2015.
McKeown, Nick et al., "OpenFlow: Enabling Innovation in Campus Networks", Apr. 2008, ACM SIGCOM, Computer Communication Review vol. 38, No. 2, pp. all.
IEEE Computer Society, "IEEE Standard for Local and metropolitan area networks Virtual Bridged Local Area Networks", May 2006, IEEE, IEEE Std 802.1Q-2005, pp. 33, 82.
Rosen, E. et al., "BGP/MPLS VPNs", Mar. 1999, IETF Network Working Group, Request for Comments: 2547, pp. 3-5.
Office Action in U.S. Appl. No. 13/995,921 dated Jul. 20, 2015.
Office Action in U.S. Appl. No. 13/995,921 dated Jan. 27, 2016.
Gude et al., "NOX: Towards an Operating System for Networks", Jul. 2008, ACM SIGCOMM, Computer Communication Review vol. 38, pp. all.
Office Action in U.S. Appl. No. 13/995,921 dated May 19, 2016.
Office Action in U.S. Appl. No. 13/995,921 dated Nov. 8, 2016.
Notice of Allowance in U.S. Appl. No. 13/995,921 dated Jun. 6, 2017.
Das et al., "Unifying Packet and Circuit Switched Networks with OpenFlow", Dec. 2009, Stanford University, OPENFLOW-TR-2009-4, pp. 10.

(56) References Cited

OTHER PUBLICATIONS

Moon, Daekyeong, "Achieving Flexibility and Performance for Packet Forwarding and Data Center Management", May 12, 2010, University of California, Dissertation—Technical Report No. UCB/EECS-2010-06, pp. 82.

* cited by examiner

NETWORK SYSTEM AND ROUTING METHOD

The present application is a Continuation Application of U.S. patent application Ser. No. 15/724,384, filed on Oct. 4, 2017, which is a Continuation Application of U.S. patent application Ser. No. 13/995,921, filed on Jun. 19, 2013, now U.S. Pat. No. 9,787,580, which is based on International Application No. PCT/JP2011/080325, filed on Dec. 27, 2011, which is based on Japanese Patent Application No. 2011-005137, filed on Jan. 13, 2011, the entire contents of which are incorporated herein by reference.

TECHNICAL FIELD

The present invention relates to a network system. More particularly, the present invention relates to a routing method for a network system.

BACKGROUND ART

A method of controlling a switch, a terminal and so on (user plane) from an external controller (control plane) is referred to as a CU (C: control plane/U: user plane) separation architecture. A network having a configuration based on the CU separation architecture is referred to as a CU separation network.

As an example of the CU separation network, an OpenFlow network is provided, to which an OpenFlow technique is applied. The OpenFlow technique executes network routing by controlling a switch from a controller. Here, the OpenFlow network is merely one example.

[Explanation of OpenFlow Network]

In the OpenFlow network, a controller like an OFC (OpenFlow Controller) controls behavior of a switch like an OFS (OpenFlow Switch) by operating a flow table of the switch.

The flow table is a table in which an entry is registered, the entry defining a predetermined processing content (action) which should be performed on a packet (communication data) that meets a predetermined matching condition (rule). The packet may be replaced by a frame. A packet group (packet sequence) meeting the rule is referred to as a flow.

The rules of the flow are defined by using various combinations of any or all of a destination address (DA), a source address (SA), a destination port (DP) and a source port (SP) included in a header field of each protocol hierarchical layer of the packet, and can be distinguishable. Here, the above addresses include a MAC address (Media Access Control address) and an IP address (Internet Protocol address). In addition, information of an Ingress port may be available for the rule of the flow.

The action of the flow is usually packet forwarding to a predetermined forwarding destination. Obviously, packet discarding may be specified as the action of the flow.

In the OpenFlow network, usually, when receiving a packet that there is no corresponding entry, a switch transmits an inquiry (entry request) with respect to the packet to a controller. Usually, the switch transmits the packet to the controller as the inquiry with respect to the packet.

In the OpenFlow network, usually, the controller is connected to switches under the controller's administration by a secure channel connection. When receiving the inquiry with respect to the packet from the switch under the controller's administration, the controller calculates a pass of the packet group (flow), and registers an entry of "the packet group (flow) is forwarded to a predetermined forwarding destination" in a flow table of the switch based on the pass. Here, the controller transmits a control message for registering the entry into the flow table to the switch.

The detail of the OpenFlow techniques is described in non patent literatures 1 and 2.

CITATION LIST

Non Patent Literature

[NPL 1] "The OpenFlow Switch Consortium", <http://www.openflowswitch.org/>

[NPL 2] "OpenFlow Switch Specification Version 1.0.0 (WireProtocol0x01) Dec. 31, 2009", <http://www.openflowswitch.org/documents/openflow-spec-v1.0.0.pdf>

SUMMARY OF INVENTION

In the OpenFlow techniques, methods of registering the entry in the flow table of the switch are divided into two main categories of a "proactive type" and a "reactive type".

In the "proactive type", the controller calculates a pass of the predetermined packet group (flow) "previously" (before data communication is started), and registers the entry in the flow table of the switch. That is, the term "proactive type" here indicates "previous entry registration" that the controller voluntarily performs.

In the "reactive type", "when receiving an inquiry with respect to the 1st packet (a new packet that there is no corresponding entry) from the switch", the controller calculates a pass of the packet group (flow), and registers the entry in the flow table of the switch. That is, the term "reactive type" here indicates "real time entry registration" that the controller performs in response to the inquiry from the switch in the actual data communication.

In the OpenFlow network, basically, the "reactive type" is mainly used, in which the controller registers, when receiving the inquiry with respect to the 1st packet from the switch, the entry regarding the received packet.

However, in actual hardware (HW), for reducing the frequency of processing of the flow table to solve a performance problem, the "proactive type" is preferable. For example, in order to make the controller enable to handle 1st packets even when a great amount of the 1st packets reaches the controller, the "proactive type" is preferable rather than the other. However, it is considered that since the number of entries becomes huge if a complete proactive type is actually applied, the reactive type is partly applied to make the restriction of the number of entries being suppressed.

In addition, it is considered that, if the proactive type is applied, a large amount flow occurrence problem caused by a virus like Nimda, an unauthorized access caused by an unknown packet and so on can be avoided, because the flows are defined before the communication is started.

Therefore, in the OpenFlow network, a concrete method for attaining the "proactive type" is desired.

A network system according to the present invention includes a plurality of switches and a controller. Each of the plurality of switches executes, on a reception packet that meets a rule of an entry registered in its own flow table, an operation based on an action defined in the entry. The controller registers an entry, in which an identifier unique to a path calculated based on a physical topology of a network composed of the plurality of switches is set as a rule and an output from a predetermined output port as an action, in each of the plurality of switches before communication is started among the plurality of switches.

In a routing method according to the present invention, each of a plurality of switches executes, on a reception packet that meets a rule of an entry registered in its own flow table, an operation based on an action defined in the entry. The controller registers an entry, in which an identifier unique to a path calculated based on a physical topology of a network composed of the plurality of switches is set as a rule and an output from a predetermined output port as an action, in each of the plurality of switches before communication is started among the plurality of switches.

A program according to the present invention is a program for making a computer execute an operation of a controller in the above routing method. Here, the program according to the present invention can be stored in a storage device and a storage medium.

This can attain a "proactive type" and solve hardware (HW) performance problem in the OpenFlow network.

DESCRIPTION OF EXEMPLARY EMBODIMENTS

The present invention targets CU separation networks. Here, an OpenFlow network which is one of the CU separation networks will be described as an example. However, actually, the CU separation networks are not limited to the OpenFlow network.

First Exemplary Embodiment

Figure 1:
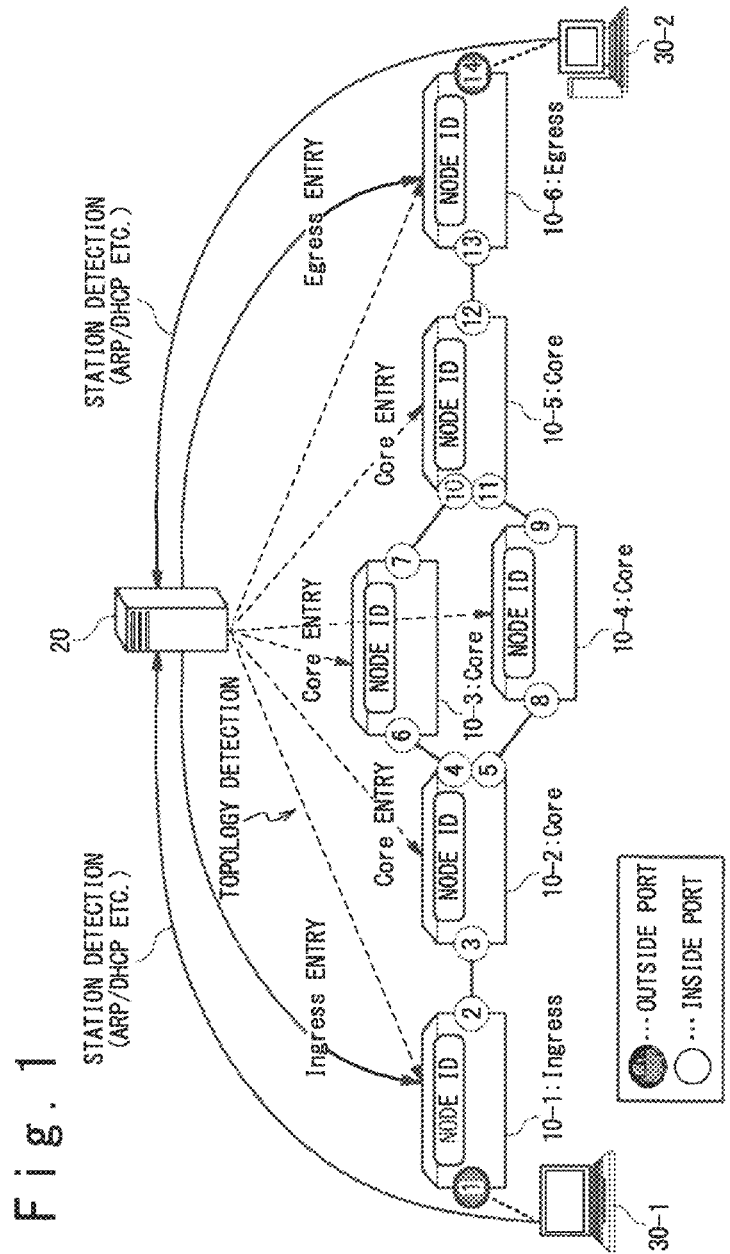
FIG. 1 is a view showing a configuration example of a network system according to the present invention.

The first exemplary embodiment of the present invention will be described below with reference to attached drawings.
[Basic Configuration]
As shown in FIG. 1, a network system according to the present invention includes switches 10 (10-$i$, $i$=1 to n: n is the number of switches) and a controller 20.

The switches 10 (10-$i$, $i$=1 to n) and the controller 20 constitute an OpenFlow network. The switches 10 (10-$i$, $i$=1 to n) are nodes in the OpenFlow network.
[Switch]
Each of the switches 10 (10-$i$, $i$=1 to n) includes a flow table internally, and forwards a packet based on an entry registered in the flow table by the controller 20.
[Controller]
The controller 20 performs detection of topology (network connection configuration) to detect the switches 10 (10-$i$, $i$=1 to n) constituting the network, and calculates a path for each flow. Consequently, the controller 20 recognizes identification information (switch ID, MAC address and so on) of all switches constituting the network and a connection configuration of each of the switches and specifies a next switch of each switch.

Here, the controller 20 correlates a switch ID (64 bits) of each switch with a node ID (16 bits) originally defined by one-to-one correspondence, before communication is started. Here, the number of bits is merely one example. That is, the controller 20 assigns a node ID to each switch. In addition, the controller 20 calculates a path between terminal-connectable edge switches and registers a core entry (relay entry) in a flow table of each of core switches (Core) which are relay switches on the path, the core entry (relay entry) indicating "when a predetermined node ID is described in at least a part of a field of destination information of a reception packet, the reception packet is made to be forwarded to a next switch (from a predetermined output port)". That is, the core switch judges whether or not forwarding can be executed based on the node ID described in the field of the destination information of the reception packet as a matching condition (rule). Obviously, the controller 20 may specify other information described in the field of the destination information of the reception packet as the matching condition (rule) instead of the node ID.

Incidentally, the controller 20 may actually register a core entry in the flow table of each of the core switches (Core), the core entry indicating "(regardless of a node ID) the reception packet is made to be forwarded to a next switch (from a predetermined output port)". In this case, the core switch (Core) forwards the reception packet to the next switch without condition.

Further, the controller 20 executes station detection (terminal detection) to detect terminals 30 (30-$j$, $j$=1 to m: m is the number of terminals), recognizes destination information (MAC address and so on) of the terminals and connection configuration, and correlates the terminal and a user ID by one-to-one correspondence. That is, the controller 20 assigns a user ID to each terminal. Here, the controller 20 detects edge switches connected to the terminals 30 (30-$j$, $j$=1 to m).

Furthermore, the controller 20 registers an egress entry (output entry) in a flow table of the edge switch, the egress entry indicating "when a node ID of the edge switch and a user ID of a terminal under control are described in at least a part of a field of destination information of a reception packet, destination information of the reception packet is made to be restored that the destination is the terminal as the destination, and the reception packet is made to be forwarded to the terminal", before communication is started.

Here, the reason why the user ID of the terminal under control is the matching condition (rule) is that a plurality of terminals under control may exist. In addition, since the combination of the node ID of the edge switch and the user ID of the terminal is the matching condition (rule), the user ID duplicated among the edge switches can be used. However, for each terminal under control of the same edge switch, the duplicated user ID cannot be used.

Moreover, the controller 20 registers an ingress entry (input entry) in a flow table of the input edge switch (Ingress), the ingress entry indicating "when receiving a predetermined packet, destination information is made to be used as a retrieval key, a node ID of an output edge switch (Egress) and a user ID of a destination terminal are made to be described in at least a part of a field of destination information of the reception packet and the reception packet is made to be forwarded to a next switch". Here, above-described a "predetermined packet" may be replaced by "a packet that meets a predetermined matching condition (rule)". In the present invention, since the input edge switch (Ingress) firstly specifies a flow, the ingress entry defines a packet matching rule similar to the usual OpenFlow and the above-mentioned action to the meeting packet.

[Ingress Entry Registration Timing]

Incidentally, two cases, which are "before communication is started" (previous registration) and "when communication is actually performed" (real time registration), are considered as the timing when the controller 20 registers the entry in the flow table of the input edge switch.

In the case of "before communication is started" (previous registration), the controller 20 previously determines a terminal (destination candidate terminal) which is a transmission destination of a predetermined packet, before communication is started. Then, before communication is started, the controller 20 registers an ingress entry in a flow table of an edge switch which can be an input edge switch, the ingress entry indicating "when receiving a predetermined packet, destination information is made to be used as a retrieval key, a node ID of an edge switch connected to the destination candidate terminal and a user ID of a destination candidate terminal are made to be described in at least a part of a field of destination information of the reception packet and the reception packet is made to be forwarded to a next switch". In the present exemplary embodiment, this case will be described.

In the "when communication is actually performed" (real time registration), the controller 20 calculates, when an input edge switch receives a packet from a transmission source terminal and then the controller 20 receives an inquiry with respect to the reception packet, a path of the reception packet group (flow). Then, based on this path, the controller 20 registers an ingress entry in a flow table of the input edge switch, the ingress entry indicating "when receiving a predetermined packet, destination information is made to be used as a retrieval key, anode ID of an edge switch connected to the destination candidate terminal and a user ID of a destination candidate terminal are made to be described in at least a part of a field of destination information of the reception packet and the reception packet is made to be forwarded to a next switch". This case will be described in the second exemplary embodiment.

[Path Specifying]

Furthermore, when there is a plurality of switches next to each switch (when there is a plurality of paths), the controller 20 defines a redundant ID for each path. Since each next switch exists on each path, each next switch is correlates with each redundant ID. The controller 20 registers a core entry in a flow table of a core switch (Core), the core entry indicating "when (a predetermined node ID and) a redundant ID is described in at least a part of a field of destination information of a reception packet, the reception packet is made to be forwarded to a next switch corresponding to the redundant ID". In addition, the controller 20 registers an ingress entry in a flow table of an input edge switch, the ingress entry indicating "when receiving a predetermined packet, destination information is made to be used as a retrieval key, a node ID of an output edge switch, a redundant ID and a user ID of a destination terminal is made to be described in at least a part of a field of destination information of a reception packet, and the reception packet is made to be forwarded to a next switch". The redundant ID may be a part of the node ID of the output edge switch. For example, leading or ending several bits of the field of the node ID may be used as a field of the redundant ID.

[Example of Hardware]

As examples of each of the switches 10 (10-*i*, i=1 to n), a network switch, a router, a proxy, a gateway, a firewall, a load balancer, a packet shaper, a SCADA (Supervisory Control And Data Acquisition), a gatekeeper, a base station, an AP (Access Point), a CS (Communication Satellite), a computing machine having a plurality of communication ports and the like may be considered. In addition, each of the switches 10 (10-*i*, i=1 to n) may be a virtual switch configured on a physical machine.

As examples of each of the controller 20 and the terminals 30 (30-*j*, j=1 to m), a PC (Personal Computer), an appliance, a thin client terminal/server, a work station, a mainframe, a super computer and the like may be supposed. In addition, each of the controller 20 and the terminals 30 (30-*j*, j=1 to m) may be a virtual machine (VM) configured on a physical machine.

Incidentally, each of the terminals 30 (30-*j*, j=1 to m) may be a cellular phone, a smartphone, a smartbook, a car navigation system, a portable video game machine, a home video game machine, a portable music player, a handy terminal, a gadget (electric device), an interactive television, a digital tuner, a digital recorder, an information home appliance, an OA (Office Automation) device or the like. In addition, each of the terminals 30 (30-*j*, j=1 to m) may be provided on a mobile object such as a vehicle, a ship and an aircraft.

Even though it is not shown here, each of the switches 10 (10-*i*, i=1 to n), the controller 20 and the terminals 30 (30-*j*, j=1 to m) is realized by a processor driven based on a program to execute a predetermined processing, a memory memorizing the program and a various kinds of data and a communication interface for being connected to a network.

As examples of the above processer, a CPU (Central Processing Unit), a microprocessor, a microcontroller, an IC (Integrated Circuit) having a specific function and the like may be considered.

As examples of the above memory, a semiconductor memory device such as a RAM (Random Access Memory), a ROM (Read Only Memory), an EEPROM (Electrically Erasable and Programmable Read Only Memory) and a flash memory, an auxiliary storage device such as a HDD (Hard Disk Drive) and a SSD (Solid State Drive), a removable disk such as a DVD (Digital Versatile Disk), a recording medium such as a SD memory card (Secure Digital memory card) or the like may be considered.

Incidentally, the above processer and the above memory may be integrated. For example, in recent years, single chip integration of a microcomputer or the like has been improved. Therefore, a case may be considered, in which a one-chip microcomputer installed in an electric device includes a processor and a memory.

As examples of the above communication interface, a board corresponding to network communication (motherboard, I/O board), a semiconductor integrated circuit such as a chip, a network adaptor such as a NIC (Network Interface Card) and a similar expansion card, a communication device such as antenna, a communication port such as a connector may be considered.

Moreover, as examples of the network, the Internet, a LAN (Local Area Network), a wireless LAN, a WAN (Wide Area Network), a Backbone), a cable television (CATV) line, a fixed phone network, a cellular phone network, a WiMAX (IEEE 802.16a), a 3G (3rd Generation), lease line, an IrDA (Infrared Data Association), a Bluetooth (registered trademark), a serial communication line, a data bus and the like may be considered.

Inside constituent elements of each of the switches 10 (10-*i*, i=1 to n), the controller 20 and the terminals 30 (30-*j*, j=1 tom) may be a module, a component, a dedicated device, or an activation (call) program thereof.

However, the above configurations are not limited to these examples actually.

Figure 2:
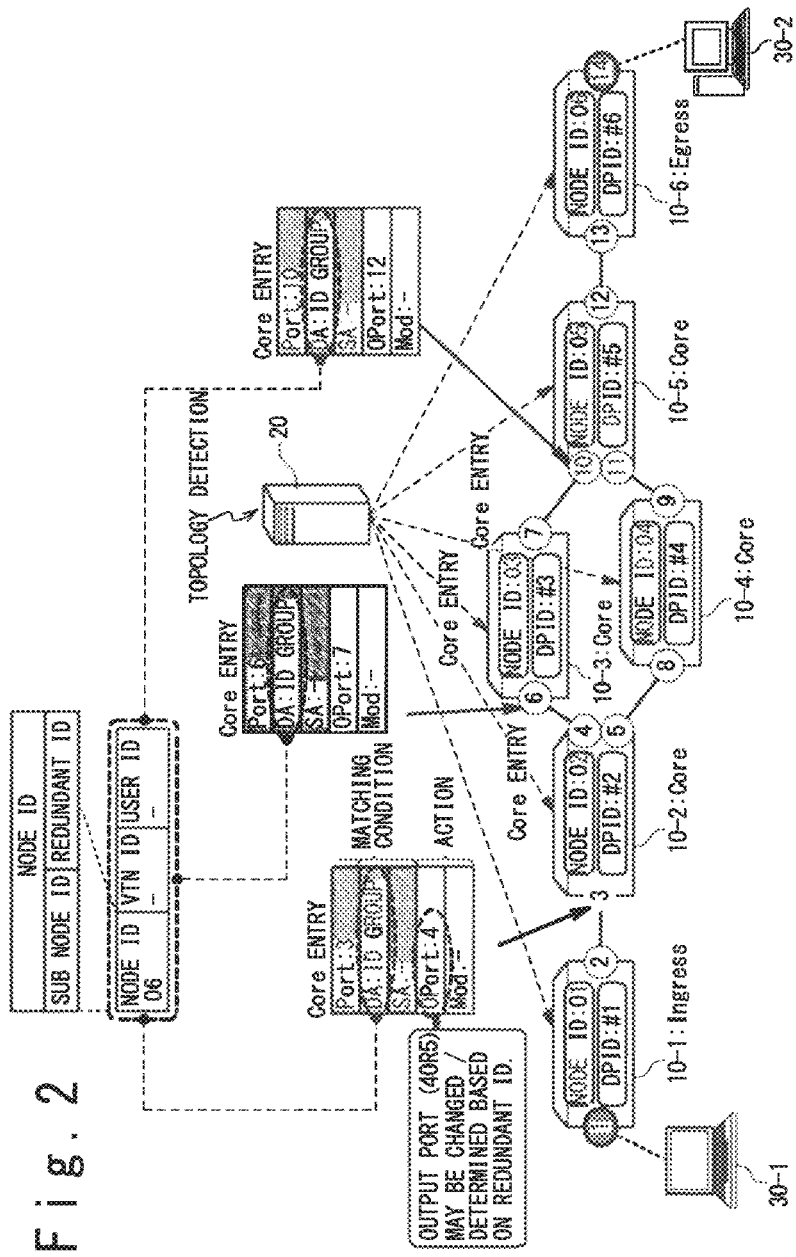
FIG. 2 is a view for explaining processing in topology detection.

With reference to FIG. 2, processing in topology detection will be described.

The controller 20 detects physical topology of a network by using the LLDP (Link Layer Discovery Protocol). The LLDP is a protocol for collecting device information of adjacent devices regularly by transmitting and receiving control frames.

Previously, an administrator terminal or the like sets inside/outside configuration (setting information) to each of the switches 10 (10-*i*, i=1 to n). Or, the controller 20 installs inside/outside configuration on each of the switches 10 (10-*i*, i=1 to n) which are under control by using secure channel connection.

The "inside configuration" is setting information for communicating with the inside of a network. The "outside configuration" is setting information for communicating with the outside of a network.

Each of the switches 10 (10-*i*, i=1 to n) stores the inside/outside configuration as status information (PortStat) of a port. In a default, each of the switches 10 (10-*i*, i=1 to n) stores the inside configuration as status information (PortStat) of a port.

Since each of the switches 10 (10-*i*, i=1 to n) has the setting of the inside/outside previously, the controller 20 can increase the topology detection speed.

The controller 20 detects the topology, collects the status information (PortStat) of the port included in each of the switches 10 (10-*i*, i=1 to n) and judges which port each of the switches 10 (10-*i*, i=1 to n) includes, the inside or the outside.

The controller 20 recognizes a port, which is explicitly set as the inside in the status information of the port, as an "inside port". In addition, the controller 20 recognizes a port, which is explicitly set as the outside in the status information of the port, as an "outside port".

The controller 20 transmits a control frame of the LLDP to a port (unset port or the like) which is not explicitly set as the inside port and the outside. Then, the controller 20 detects the physical topology of the network based on a response to the control frame of the LLDP, and creates topology information.

At this time, the controller 20 acquires a switch ID of each of the switches 10 (10-*i*, i=1 to n) under control, and correlates a switch ID of each of the switches 10 (10-*i*, i=1 to n) with a node ID. At this moment, a switch ID of only a switch (edge switch) including an outside port may be correlated with a node ID. Here, as the switch IDs, "DPIDs: #1 to #6" are shown. Actually, "DPIDs: #1 to #6" may be used as the node IDs without change.

In addition, the node ID includes a sub node ID and a redundant ID. The sub node ID is a substantial body of the node ID for specifying a switch. The sub node ID may be identification information capable of specifying a switch by itself. Or, the sub node ID may be information constituting a node ID, which is capable of uniquely specifying a switch, by being combined with a redundant ID. The redundant ID is identification information for specifying a path. Each of the switches 10 (10-*i*, i=1 to n) may determine a port for forwarding a packet to a next switch based on the redundant ID and transmit a reception packet to the port. Actually, if relativity with the node ID is maintained and it is possible to specify as a redundant ID, the redundant ID may be stored in another field.

The controller 20 calculates a path between switches (edge switches) including an outside port, and registers a core entry to a flow table of each core switch (Core) on the path, the core entry indicating "when a predetermined node ID (node ID of an edge switch including an outside port) is described in at least a part of a field of destination information of a reception packet, the reception packet is made to be forwarded to a next switch of the path". That is, the core switch judges whether or not the packet is made to be forwarded by using the node ID described in the field of the destination information of the reception packet as a matching condition (rule). Obviously, the controller 20 may specify other information (VTNID, user ID and the like) described in the field of the destination information of the reception packet as the matching condition (rule).

Incidentally, the controller 20 may actually register a core entry in the flow table of each of the core switches (Core), the core entry indicating "(regardless of a node ID) the reception packet is made to be forwarded to a next switch (from a predetermined output port)". In this case, the core switch (Core) forwards the reception packet to the next switch without condition. The input edge switch (Ingress) and the output edge switch (Egress) judge whether or not the reception packet is made to be forwarded.

Here, the controller 20 calculates a path between all switches including an outside port, and registers the above core entry in a flow table of each core switch (Core) on the path.

[Configuration Example of Entry]

A configuration example of the entry will be described below.

The entry includes data storage fields such as a "Port", a "DA" (Destination Address), a "SA" (Source Address), an "OPort" (Output Port), and a "Mod" (Modify).

The "Port" is a storage field of information indicating an input port of a reception packet. The "DA" is a storage field of destination information of a reception packet. The "SA" is a storage field of transmission source information of a reception packet. The "OPort" is a storage field of information indicating an output port of a reception packet. The "Mod" is a storage field of information defining processing performed on a reception packet.

The "Port", the "DA" and the "SA" correspond to the matching condition (rule). In addition, the "OPort" and the "Mod" correspond to the processing content (action).

An "ID group" stored in the "DA" is information such as the "node ID", the "VTN ID" and the "user ID". The "node ID" is a storage field of identification information for specifying a switch (node including an outside port) to be an output edge switch. The "VTN ID" is a storage field of identification information of a VN (Virtual Network), such as a VTN (Virtual Tenant Network), to which a packet group (flow) passing through a path between switches with an outside port belongs. The "user ID" is a storage field of identification information of a user ID for specifying a terminal (terminal connected or to be connected to a switch with an outside port) to be a destination. Correlating the terminal with the user ID will be executed by using a "station detection" described below.

[Station Detection]

Figure 3:
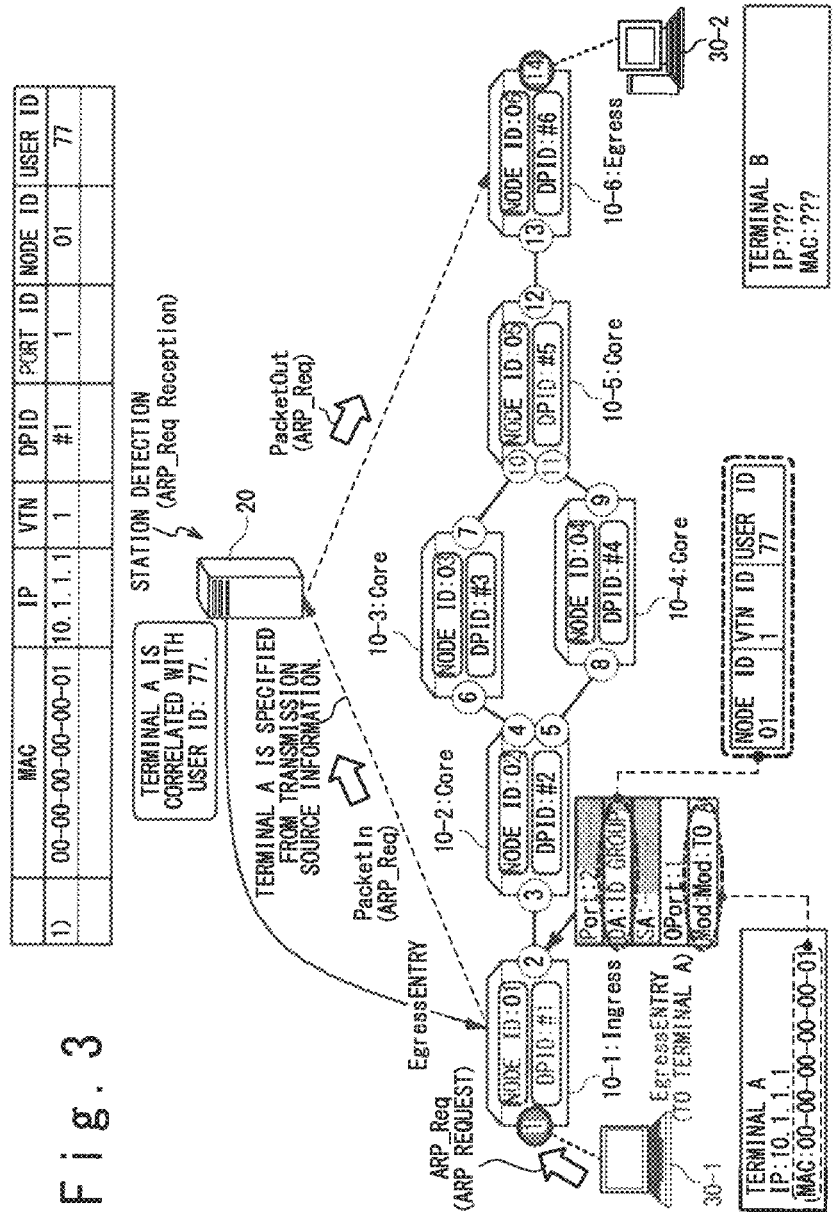
FIG. 3 is a view for explaining processing in station detection (using ARP request)
Figure 4:
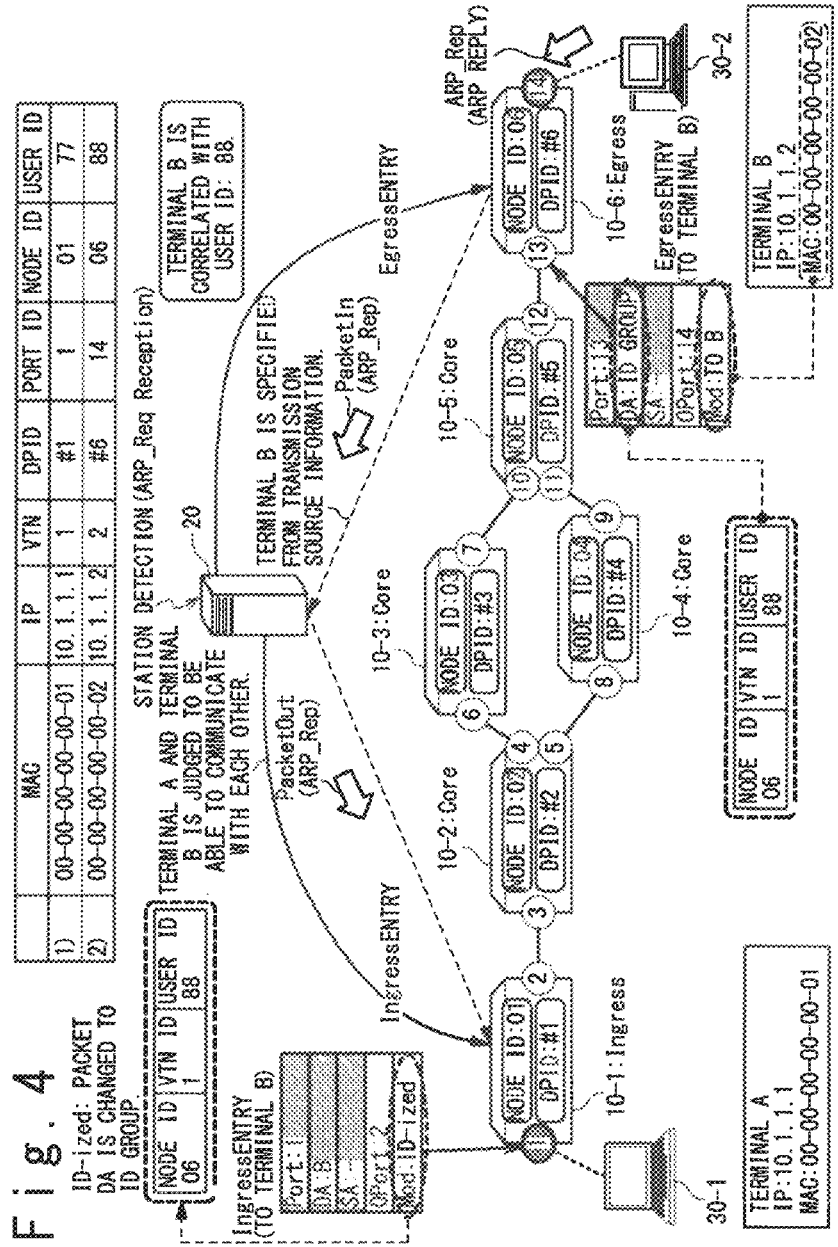
FIG. 4 is a view for explaining processing in station detection (using ARP reply)

With reference to FIGS. 3 and 4, processing in the station detection will be described.

The controller 20 executes the station detection by using a control frame of the ARP (Address Resolution Protocol), which is transmitted for address solution by a terminal.

Incidentally, the control frame of the ARP is merely one example. For example, a control frame of the DHCP (Dynamic Host Configuration Protocol) may be used. In addition, the present exemplary embodiment is not limited to the control frame.

Here, a terminal 30-1 and a terminal 30-2 are assumed to be a "terminal A" and a "terminal B", respectively.

(1) Using ARP_Req (ARP Request)

As shown in FIG. 3, when the terminal A communicates with the terminal B, if a MAC address of the terminal B is not known and only an IP address of the terminal B is known, the terminal A transmits an ARP_Req (ARP request) for solving the address of the terminal B by broadcast.

The edge switch 10-1 to which the terminal A is connected forwards the ARP_Req (ARP request) to the controller 20 through the secure channel connection. At this moment, the controller 20 operates as an ARP proxy.

When receiving the ARP_Req (ARP request) from the edge switch 10-1 to which the terminal A is connected, the controller 20 acquires the MAC address (and the IP address) of the terminal A from transmission source information of the ARP_Req (ARP request), and assign a user ID to the terminal A. That is, the controller 20 correlates the MAC address (and the IP address) of the terminal A with the user ID.

The controller 10 registers an egress entry in a flow table of the edge switch 10-1 to which the terminal A is connected, the egress entry indicating "when (an node ID of the edge switch and) an user ID of the terminal A under control is described in at least a part of a field of destination information of a reception packet, the destination information of the reception packet is made to be restored that the destination is the MAC address of the terminal A, and the reception packet is made to be forwarded to the MAC address of the terminal A".

To solve the address of the terminal B to be a target, as the ARP proxy, the controller 20 transmits an ARP_Req (ARP request) to each of the switches 10 (10-$i$, i=1 to n) under control by broadcast through the secure channel connection. At this time, the transmission source MAC address of the ARP_Req (ARP request) is the MAC address of the terminal A.

An edge switch 10-6 to which the terminal B is connected forwards the ARP_Req (ARP request) transmitted by broadcast to the terminal B.

Here, as simplifying the explanation, only the terminal B is assumed to be a destination terminal. However, processing similar to the above is preformed on edge switches to which other destination terminals are connected.

(2) Using ARP_Rep (ARP Reply)

As shown in FIG. 4, the terminal B transmits an ARP_Rep (ARP reply) in which the destination is the terminal A as a response to the ARP_Req (ARP request).

The edge switch 10-6 to which the terminal B is connected forwards the ARP_Rep (ARP reply) to the controller 20 through the secure channel connection. At this time, the controller 20 operates as an ARP proxy.

When receiving the ARP_Rep (ARP reply) from the edge switch 10-6 to which the terminal B is connected, the controller 20 acquires the MAC address (and the IP address) of the terminal B from the transmission source information of the ARP_Rep (ARP reply), and assigns a user ID to the terminal B. That is, the controller 20 correlates the MAC address (and the IP address) of the terminal B with the user ID.

The controller 20 registers an egress entry in the flow table of the edge switch 10-6 to which the terminal B is connected, the egress entry indicating "when (an node ID of the edge switch and) an user ID of the terminal B under control is described in at least a part of a field of destination information of a reception packet, the destination information of the reception packet is made to be restored that the destination is the MAC address of the terminal B, and the reception packet is made to be forwarded to the MAC address of the terminal B".

At this moment, the controller 20 may judge that the communication between the terminal A and the terminal B can be carried out, and register an ingress entry to the flow table of the edge switch 10-1 to which the terminal A is connected, the ingress entry indicating "when receiving a packet whose destination is the terminal B, an ID group (an node ID of an edge switch to which the terminal B is connected, a VTN ID of the flow, a user ID of the terminal B) is made to be described in at least a part of a field of destination information of the reception packet, and the reception packet is made to be forwarded to a next switch". This entry registration method is the "proactive type" (method that an ingress entry is previously made to be registered).

As forwarding the ARP_Rep (ARP reply) to the terminal A, as the ARP proxy, the controller 20 transmits the ARP_Rep (ARP reply) to the edge switch 10-1 to which the terminal A is connected through the secure channel connection. At this time, the transmission source MAC address of the ARP_Rep (ARP reply) is the MAC address of the terminal B.

The edge switch 10-1 to which the terminal A is connected forwards the ARP_Rep (ARP reply) received from the controller 20 to the terminal A.

The terminal A acquires the MAC address of the terminal B from the ARP_Rep (ARP reply) received as the response to the ARP_Req (ARP request)

[Data Communication after Entry Registration Completion]

Figure 5:
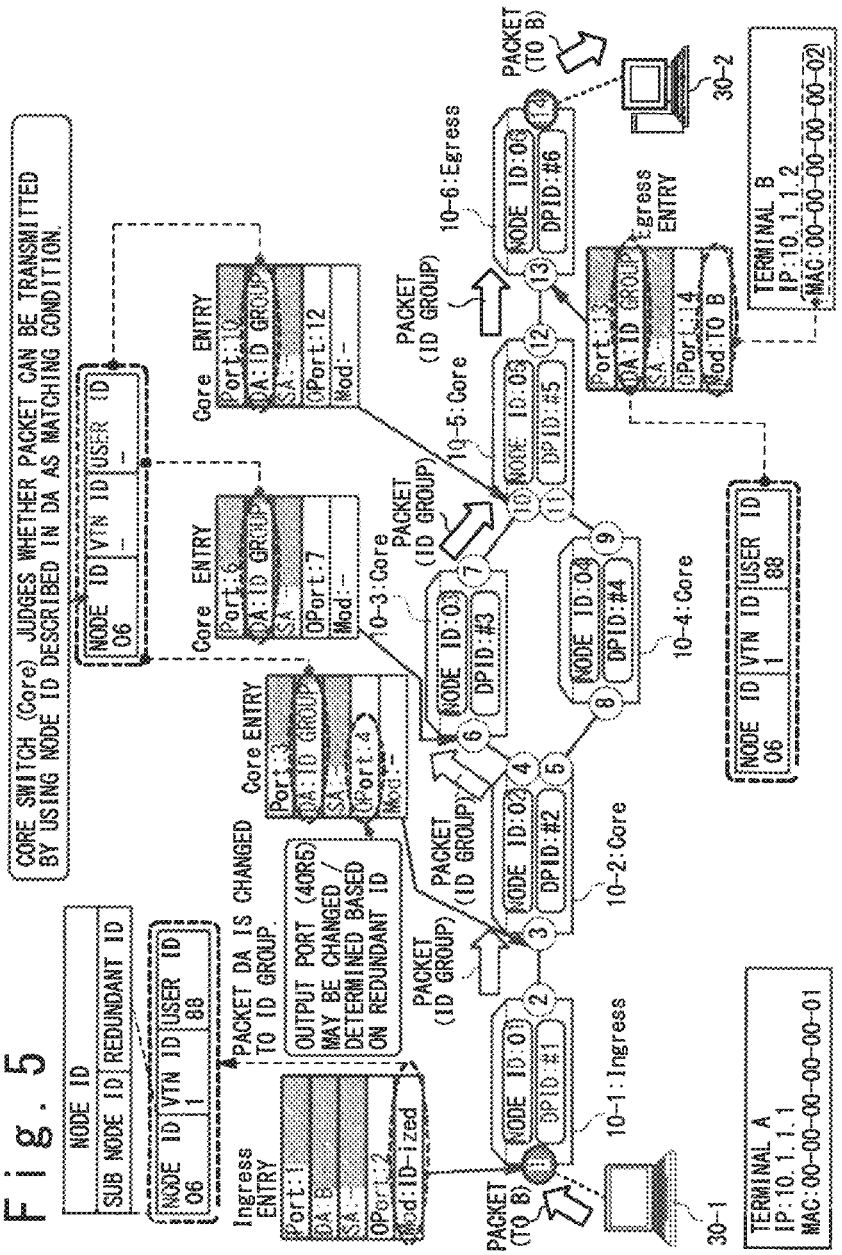
FIG. 5 is a view for explaining processing in data communication after entry registration is completed.

With reference to FIG. 5, processing of communication of IP packets and the like between switches after the entry registration completion will be described.

At this moment, it is assumed that necessary registration has been completed for all switches between switches. That is, the operation of the controller 20 has been completed.

The terminal A describes the MAC address (and the IP address) of the terminal B which is a destination in the field of the destination information of the packet and transmits the packet whose destination is the terminal B.

When receiving the packet whose destination is the terminal B at an input port 1, the edge switch 10-1 to which the terminal A is connected confirms whether or not an entry that meets the reception packet is registered in the own flow table.

The ingress entry is registered in the own flow table, the ingress entry indicating "when receiving a packet whose destination is the terminal B, an ID group (an node ID of the edge switch 10-6 to which the terminal B is connected, a VTN ID of the flow, a user ID of the terminal B) is made to be described in at least a part of a field of destination information of the reception packet, and the reception packet is made to be forwarded to a next switch". Thus, the edge switch 10-1 to which the terminal A is connected describes the ID group in at least a part of the field of the destination information of the reception packet, and forwards the reception packet to a next switch. Here, the edge switch 10-1 changes the MAC address of the terminal B described in the destination information of the reception packet into the ID group (overwrites the destination information with the ID group), forwards the changed packet (herein after referred to as the ID-ized packet) to an output port 2, and forwards the ID-ized packet from the output port 2 to a next switch 10-2.

When receiving the ID-ized packet at an input port 3, the edge switch 10-2 confirms whether or not an entry that meets the ID-ized packet is registered in the own flow table.

The core entry is registered in the own flow table, the core entry indicating "when a node ID of the edge switch 10-6 is described in at least a part of a field of destination information of a reception packet, the reception packet is made to be forwarded to a next switch (from a predetermined output port)". Thus, the edge switch 10-2 forwards the ID-ized packet to an output port 4, and forwards the ID-ized packet from the output port 4 to a next switch 10-3. Here, the edge switch 10-2 determines which the ID-ized packet is forwarded to, the output 4 or an output 5, based on a value of an "OPort" of the core entry.

At this time, when the ID-ized packet includes a redundant ID, the edge switch 10-2 retrieves a core entry corresponding to the ID-ized packet by using a value of the redundant ID as a retrieval key.

When receiving the ID-ized packet at an input port 10, the edge switch 10-3 confirms whether or not an entry that meets the ID-ized packet is registered in the own flow table.

The core entry is registered in the own flow table, the core entry indicating "when a node ID of the edge switch 10-6 is described in at least a part of a field of destination information of a reception packet, the reception packet is made to be forwarded to a next switch (from a predetermined output port)". Thus, the edge switch 10-3 forwards the ID-ized packet to an output port 12, and forwards the ID-ized packet from the output port 12 to a next switch 10-6.

When receiving the ID-ized packet at an input port 13, the edge switch 10-6 confirms whether or not an entry that meets the ID-ized packet is registered in the own flow table.

The egress entry is registered in the own flow table, the egress entry indicating "when (an node ID of the edge switch 10-6 and) an user ID of the terminal B under control is described in at least a part of a field of destination information of a reception packet, the determination information of the reception packet is made to be restored that the destination is the MAC address of the terminal B, and the reception packet is made to be forwarded to the MAC address of the terminal B." Thus, the edge switch 10-6 to which the terminal B is connected changes the ID group described in the field of the destination information of the ID-ized packet into the MAC address of the terminal B as the destination (overwrites the destination information with the MAC address of the terminal B), and forwards the changed packet (original reception packet) to an output port 14, and forwards the packet from the output port 14 to the terminal B.

Incidentally, in the above description, the "MAC address field" is used as an example of the field of the destination information. However, an "IP address field" may be available. That is, a "destination address field" may be available.

Second Exemplary Embodiment

The second exemplary embodiment of the present invention will be described below.

In the present exemplary embodiment, a case will be described, in which, not when station detection is executed, but when communication of an IP packet or the like between switches is started, an "ingress entry" is made to be registered in a flow table of an input edge switch.

Here, a situation that only processing in which an "egress entry" is made to be registered in an edge switch is executed by station detection (using an ARP request) shown in FIG. 3, or, a situation that processing in which an "ingress entry" is made to be registered in an edge switch is not executed when station detection (using an ARP reply) is executed shown in FIG. 4, is assumed.

[Inquiry of Packet]

Figure 6:
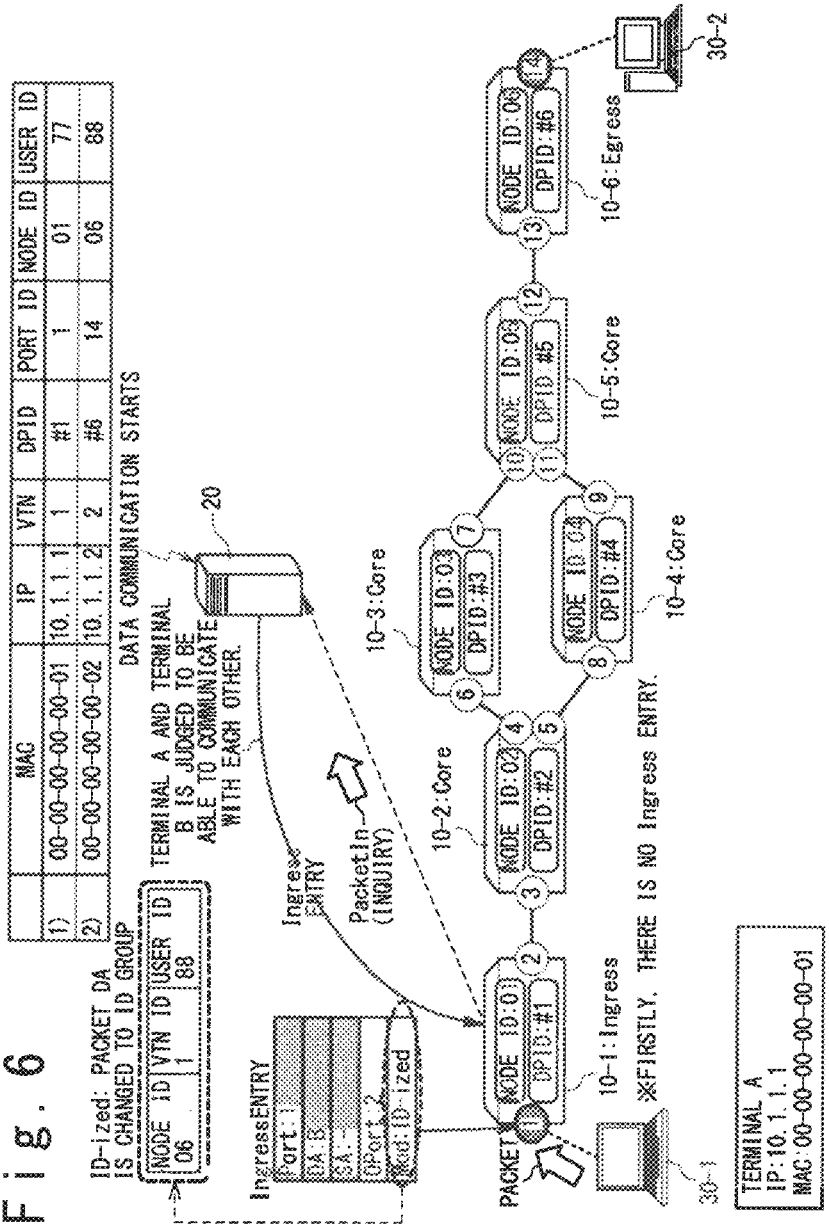
FIG. 6 is a view for explaining processing in inquiry of a packet to a controller.

With reference to FIG. 6, processing in an inquiry of a packet when data communication is started will be described.

When receiving an inquiry of a reception packet from a switch under control, the controller 20 registers an ingress entry as a response, through the secure channel connection.

Firstly, the terminal A describes a MAC address (and an IP address) of the terminal B which is a destination in a field of destination information of a packet, and transmits the packet whose destination is the terminal B.

When receiving the packet whose destination is the terminal B, the edge switch 10-1 to which the terminal A is connected confirms whether or not an entry that meets the packet is registered in the own flow table. At this moment, in the edge switch 10-1 to which the terminal A is connected, the entry (ingress entry) that meets the packet is not registered. Thus, the edge switch 10-1 to which the terminal A is connected forwards the packet whose destination is the terminal B to the controller 20 through the secure channel connection.

The controller 20 acquires the MAC address (and the IP address) of the terminal B from the destination information of the packet whose destination is the terminal B, and specifies a user ID of the terminal B and a node ID of the edge switch 10-6 to which the terminal B is connected from topology information and station information that the controller 20 has.

The controller 20 registers an ingress entry in the flow table of the edge switch 10-1 to which the terminal A is connected, the ingress entry indicating "when receiving a packet whose destination is the terminal B, an ID group (a node ID of an edge switch to which the terminal B is connected, an VTN ID of the flow, a user ID of the terminal B) is made to be described in at least a part of a field of destination information of the reception packet, and the reception packet is made to be forwarded to a next switch". This entry registration method is the "reactive type" (method of registering an ingress entry when a first packet is reached).

Relationship Between Respective Exemplary Embodiments

Incidentally, the above respective exemplary embodiments can be combined and performed. For example, in the network system according to the present invention, the switches corresponding to the first exemplary embodiment and the switches corresponding to the second exemplary embodiment may be mixed. In addition, when a plurality of VTNs exists, the exemplary embodiments may be separated for respective VTNs.

(Supplementary Note)

The whole or part of the exemplary embodiments disclosed above can be described as, but not limited to, the following supplementary notes.

(Supplementary Note 1: System Configuration)

A network system comprising:

a plurality of switches, each configured to execute, on a reception packet that meets a rule of an entry registered in its own flow table, an operation based on an action defined in the entry; and a controller configured to register an entry, in which an identifier unique to a path calculated based on a physical topology of a network composed of the plurality of switches is set as a rule and an output from a predetermined output port as an action, in each of the plurality of switches before communication is started among the plurality of switches.
(Supplementary Note 2: Core Entry Registration)

The network system according to supplementary note 1, wherein the controller includes:

a port information collecting section configured to install setting information of inside and outside in the each of the plurality of switches and collect port information of the each switch, in topology detection before communication is started;

a switch specifying section configured to specify an inside port and an outside port, and specify an edge switch and a core switch, based on port information of the each switch;

a control frame transmitting section configured to transmit a control frame for collecting adjacent switch information to a port in which there is no explicit setting regarding an inside port and an outside;

a topology information creating section configured to detect physical topology of a network based on a response to the control frame and create topology information;

a node ID assigning processing section configured to correlate the each switch with an node ID as an unique identifier; and a relay entry registering section configured to calculate a path between switches including an outside port, and register a relay entry in a flow table of a core switch, the relay entry indicating that when a node ID of an edge switch is described in a field of destination information of a reception packet, the reception packet is made to be forwarded to a next switch.
(Supplementary Note 3: Transmission Egress Entry Registration)

The network system according to supplementary note 2, wherein the controller includes:

a transmission source terminal specifying section configured to specify, based on an ARP request from a transmission source terminal, destination information of the transmission source terminal, in station detection before communication is started;

a transmission source user ID assigning processing section configured to correlate the transmission source terminal with a user ID as the unique identifier; and a transmission source terminal output entry registering section configured to register an output entry in a flow table of an edge switch to which the transmission source terminal is connected, the output entry indicating that when a node ID of the edge switch and a user ID of the transmission source terminal are described in a field of destination information of a reception packet, destination information of the transmission source terminal is made to be described in a field of destination information of the reception packet and the reception packet is made to be forwarded to the transmission source terminal.
(Supplementary Note 4: Reception Egress Entry Registration)

The network system according to supplementary note 3, wherein the controller includes:

a destination terminal specifying section configured to specify, based on an ARP reply from a destination terminal, destination information of the destination terminal in station detection before communication is started;

a destination user ID assigning processing section configured to correlates a user ID as the unique identifier to the destination terminal; and a destination terminal output entry registering section configured to register an output entry in a flow table of an edge switch to which the destination terminal is connected, the output entry indicating that when a node ID of the edge switch and a user ID of the destination terminal are described in a field of destination information of a reception packet, destination information of the destination terminal is made to be described in a field of destination information of the reception packet and the reception packet is made to be forwarded to the destination terminal.
(Supplementary Note 5: Transmission Ingress Entry Registration (Proactive Type))

The network system according to supplementary note 4, wherein the controller includes:

a communication availability judging section configured to judge whether or not communication between the transmission source terminal and the destination terminal enables to be performed based on an ARP reply from the destination terminal in station detection before communication is started; and a transmission source terminal input entry registering section configured to register an input entry in a flow table of an edge switch to which the transmission source terminal is connected, the input entry indicating that when a packet to the destination terminal is received, anode ID of an edge switch to which the destination terminal is connected and a user ID of the destination terminal are made to be described in at least a part of a field of destination information of the reception packet and the reception packet is made to be forwarded to a next switch.
(Supplementary Note 6: Transmission Ingress Entry Registration (Reactive Type))

The network system according to supplementary note 4, wherein the controller includes:

a communication availability judging section configured to judge whether or not communication between the transmission source terminal and the destination terminal enables to be performed based on an inquiry of a packet from an edge switch to which transmission source terminal is connected, when communication is started; and a transmission source terminal input entry registering section configured to register an input entry in a flow table of an edge switch to which the transmission source terminal is connected, the input entry indicating that when a packet to the destination terminal is received, anode ID of an edge switch to which the destination terminal is connected and a user ID of the destination terminal are made to be described in at least a part of a field of destination information of the reception packet and the reception packet is made to be forwarded to a next switch.

Although the present invention has been described above in connection with several exemplary embodiments thereof, it would be apparent that the present invention is not limited to those exemplary embodiments, and may be modified and changed without departing from the scope and spirit of the invention.

This application is based upon and claims the benefit of priority from Japanese patent application No. 2011-005137, the disclosure of which is incorporated herein in its entirety by reference.

What is claimed is:

1. A network system, comprising:
a plurality of edge nodes including a first edge node and a second edge node;
a virtual machine which belongs to a virtual network; and
a control apparatus configured to control the plurality of edge nodes;

wherein the control apparatus comprises:
a non-transitory memory configured to store program instructions; and
a processor configured to execute the instructions to:
receive an identifier corresponding to the virtual machine from the first edge node, before the virtual machine operates communication,
select the second edge node from the plurality of edge nodes based on the identifier of the virtual machine; and
send an instruction to the first edge node, wherein the instruction is configured to control the first edge node to add, to a packet for the virtual machine, an identifier of the virtual network, an identifier of the first edge node and a user identifier of the virtual machine, and send the packet to the second edge node,
wherein the user identifier of the virtual machine is different from the identifier of the virtual machine and the identifier of the virtual network.

2. The network system according to claim 1, further comprising a plurality of routers configured to forward the packet based on the identifier of the first edge node.

3. The network system according to claim 1, wherein the identifier of the virtual network represents a tenant.

4. The network system according to claim 1, wherein the first edge node and second edge node include a virtual switch on a physical machine.

5. A control apparatus configured to control a plurality of edge nodes including a first edge node and a second edge node, comprising:
a non-transitory memory configured to store program instructions; and
a processor configured to execute the instructions to:
receive an identifier corresponding to a virtual machine from the first edge node, before the virtual machine operates communication, wherein the virtual machine belongs to a virtual network;
select the second edge node from the plurality of edge nodes based on the identifier of the virtual machine; and
send an instruction to the first edge node, wherein the instruction is configured to control the first edge node to add, to a packet for the virtual machine, an identifier of the virtual network, an identifier of the first edge node and a user identifier of the virtual machine, and send the packet to the second edge node,
wherein the user identifier of the virtual machine is different from the identifier of the virtual machine and the identifier of the virtual network.

6. The control apparatus according to claim 5, configured to control a plurality of routers configured to forward the packet based on the identifier of the first edge node.

7. The control apparatus according to claim 5, wherein the identifier of the virtual network represents a tenant.

8. The control apparatus according to claim 5, wherein the first edge node and second edge node include a virtual switch on a physical machine.

9. A communication method, comprising:
receiving an identifier corresponding to a virtual machine from a first edge node, before the virtual machine operates communication, wherein the virtual machine belongs to a virtual network;
select a second edge node from a plurality of edge nodes, based on the identifier of the virtual machine; and
send an instruction to the first edge node, wherein the instruction is configured to control the first edge node to add, to a packet for the virtual machine, an identifier of the virtual network, an identifier of the first edge node and a user identifier of the virtual machine, and send the packet to the second edge node,
wherein the user identifier of the virtual machine is different from the identifier of the virtual machine and the identifier of the virtual network.

10. The communication method according to claim 9, further comprising control a plurality of routers configured to forward the packet based on the identifier of the first edge node.

11. The communication method according to claim 9, wherein the identifier of the virtual network represents a tenant.

12. The communication method according to claim 9, wherein the first edge node and second edge node include a virtual switch on a physical machine.

* * * * *